（12）United States Patent
Chih et al.

(10) Patent No.: US 11,392,530 B2
(45) Date of Patent: Jul. 19, 2022

(54) ADAPTER CARDS FOR DISCRETE GRAPHICS CARD SLOTS

(71) Applicant: HEWLETT-PACKARD DEVELOPMENT COMPANY, L.P., Spring, TX (US)

(72) Inventors: Po-Ying Chih, Taipei (TW); Chao-Wen Cheng, Taipei (TW); Chun-Yi Liu, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/052,129

(22) PCT Filed: Oct. 23, 2018

(86) PCT No.: PCT/US2018/056960
§ 371 (c)(1),
(2) Date: Oct. 30, 2020

(87) PCT Pub. No.: WO2020/086058
PCT Pub. Date: Apr. 30, 2020

(65) Prior Publication Data
US 2021/0365398 A1    Nov. 25, 2021

(51) Int. Cl.
*G06F 13/40* (2006.01)
*G06F 1/18* (2006.01)
(Continued)

(52) U.S. Cl.
CPC ............ *G06F 13/4068* (2013.01); *G06F 1/12* (2013.01); *G06F 1/26* (2013.01); *G06F 13/4282* (2013.01);
(Continued)

(58) Field of Classification Search
CPC ..... G06F 13/4068; G06F 13/385; G06F 1/185
See application file for complete search history.

(56) References Cited

U.S. PATENT DOCUMENTS 9,818,456 B1    11/2017   Wu et al.
9,940,688 B2    4/2018    Alshinnawi
(Continued)

FOREIGN PATENT DOCUMENTS

| CN | 2802583 Y | 8/2006 |
|---|---|---|
| CN | 202049423 U | 11/2011 |
| WO | WO-2017203360 | 11/2017 |

OTHER PUBLICATIONS

MXM Graphics Module Mobile PCI Express Module Electromechanical Specification Version 3.1.

*Primary Examiner* — Zachary K Huson
(74) *Attorney, Agent, or Firm* — HP Inc. Patent Department

(57) ABSTRACT

In one example, an adapter card may include a circuit board having a male interface to be inserted into a discrete graphics card slot and a peripheral component interconnect express (PCIe) slot to communicatively couple a PCIe device. Further, the adapter card may include a voltage converter circuit disposed on the circuit board to convert a first voltage associated with the discrete graphics card slot to a second voltage corresponding to the PCIe device and a level shifter circuit disposed on the circuit board to modify a signal level in the discrete graphics card slot to a signal level in the PCIe device.

13 Claims, 4 Drawing Sheets

(51) Int. Cl.
*G06F 13/38* (2006.01)
*G06F 1/12* (2006.01)
*G06F 1/26* (2006.01)
*G06F 13/42* (2006.01)

(52) U.S. Cl.
CPC ............ *G06F 1/185* (2013.01); *G06F 13/385* (2013.01); *G06F 2213/0026* (2013.01)

(56) References Cited

U.S. PATENT DOCUMENTS

| | | |
|---|---|---|
| 10,359,815 B1* | 7/2019 | Lin .................... H01R 12/7082 |
| 2005/0270298 A1 | 12/2005 | Thieret |
| 2006/0274073 A1 | 12/2006 | Johnson |
| 2010/0007668 A1 | 1/2010 | Casparian |
| 2012/0260015 A1* | 10/2012 | Gay ...................... G06F 13/409 |
| | | 710/301 |
| 2012/0311215 A1 | 12/2012 | Cong |
| 2015/0003004 A1 | 1/2015 | Wu et al. |
| 2015/0261710 A1 | 9/2015 | Billi et al. |
| 2015/0294434 A1 | 10/2015 | Nataros |
| 2018/0011713 A1 | 1/2018 | Sun et al. |
| 2019/0220428 A1* | 7/2019 | Beckett ..................... G06F 9/00 |

* cited by examiner

ADAPTER CARDS FOR DISCRETE GRAPHICS CARD SLOTS

BACKGROUND

Electronic devices may incorporate a separate graphics card that enables rapid graphics processing for graphics-intensive applications, such as gaming applications. The graphics card may include a printed circuit board (PCB), upon which a plurality of circuit components (e.g., memory chips) and a graphics processing unit (GPU) are mounted. Graphics cards are designed to conform to a card specification, such as the peripheral component interconnect express (PCIe), that enable the graphics cards to be used in a variety of electronic devices. The graphics card may be connected via a mobile PCI express module (MXM) interface, which is an interconnect standard for GPUs in electronic devices using the PCI Express.

BRIEF DESCRIPTION OF THE DRAWINGS

Examples are described in the following detailed description and in reference to the drawings, in which.

DETAILED DESCRIPTION

Figure 1:
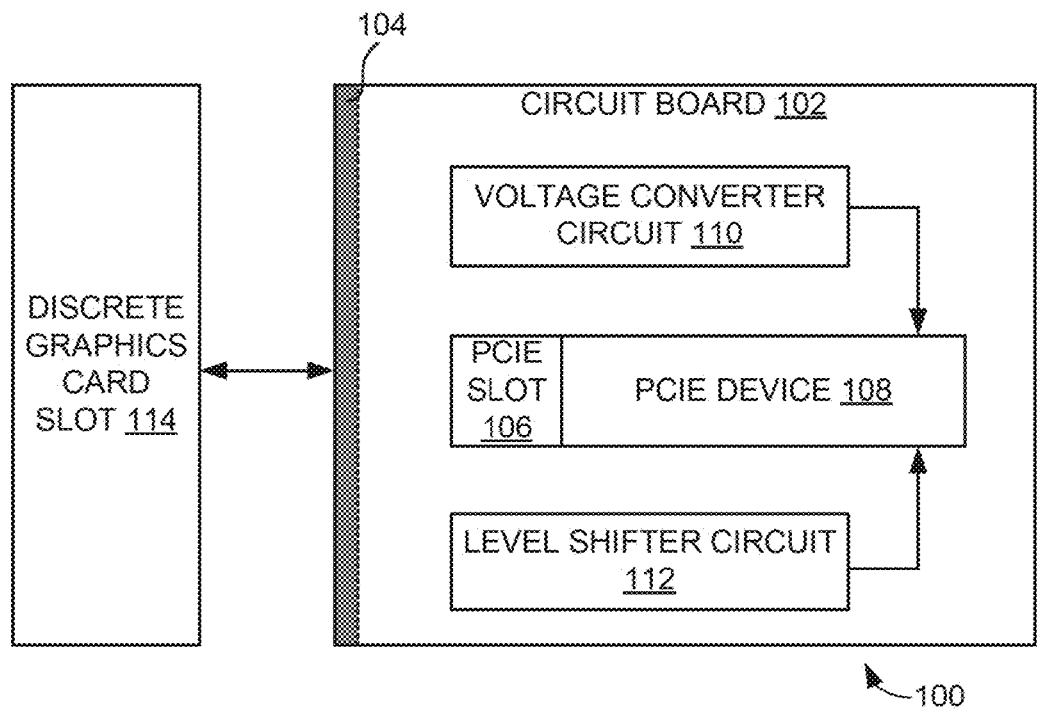
FIG. 1 is a block diagram of an example adapter card that can be inserted into a discrete graphics card slot to support a peripheral component interconnect express (PCIe) device.

With regards to graphics processing, electronic devices, both desktops and laptops, may employ a graphics card when running a game or graphics processing intensive applications. The graphics card may include one or more specially designed processors (also called discrete graphics processing units (GPUs)) and increased memory to handle such computationally intensive graphics processing tasks. The graphics processing may be substantially or entirely offloaded from the central processor unit (CPU) of the electronic device and processed by the graphics card. The graphics card may be a separate add-in board or a separate chip on the system board. The graphics card may use own video random access memory (VRAM) instead of using system random access memory (RAM) for video processing. The term "Discrete GPU" may be used interchangeably with "Dedicated GPU" or "Dedicated Graphics" as opposed to "Integrated Graphics" which occur when the graphics processing is done within the CPU.

The graphics card may refer to a stand-alone graphics card plugged into a motherboard slot such as a mobile PCI express module (MXM) slot. MXM is an interconnect standard for the GPUs in electronic devices using the peripheral component interconnect express (PCIe). As electronic devices are made increasingly smaller, the number of slots for expansion cards, which increase the capabilities of a thin client device, may be reduced and/or eliminated. For example, thin client devices may include fewer PCIe slots (e.g., PCIe ×4 slots for storage devices) and may also include less physical space for the expansion cards. However, some users may prefer increased PCIe slots to connect additional storage devices (e.g., solid-state drives (SSDs)) rather than discrete GPUs. In such cases, the SSDs having a PCIe ×4 interface may not be capable of natively mating with the MXM slots employed by the motherboards.

Examples described herein may provide an adapter card for discrete graphics card slots (e.g., MXM slots). Example adapter card may be an MXM to PCIe slot adapter card. The PCIe ×16 (16-lanes) from CPU to the MXM slot can be configured to 1×8 (8-lanes) and 2×4 (two 4-lanes). Further, the 2×4 (two 4-lanes) can be connected to two PCIe slots on the adapter card via the MXM slot. Thus, examples described herein may facilitate two PCIe ×4 slots for users pursuing increased SSDs regardless of discrete GPU.

In the following description, for purposes of explanation, numerous specific details are set forth in order to provide a thorough understanding of the present techniques. It will be apparent, however, to one skilled in the art that the present apparatus, devices and systems may be practiced without these specific details. Reference in the specification to "an example" or similar language means that a particular feature, structure, or characteristic described is included in at least that one example, but not necessarily in other examples.

An "operable connection", or a connection by which entities are "operably connected", is one in which signals, physical communications, and/or logical communications may be sent and/or received. An operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

In one example, the adapter card may include a male interface to be inserted into a discrete graphics card slot and a PCIe slot to communicatively couple a PCIe device (e.g., an SSD). Further, the adapter card may include a voltage converter circuit to convert a first voltage associated with the discrete graphics card slot to a second voltage corresponding to the PCIe device. During operation, PCIe signals of the discrete graphics card slot may support the PCIe device via the PCIe slot.

Turning now to the figures, FIG. 1 is a block diagram of an example adapter card 100 that can be inserted into a discrete graphics card slot 114 to support a PCIe device 108. In one example, adapter card 100 can be removably connectable to a motherboard of an electronic device via discrete graphics card slot 114. Example electronic device may be a thin client device, a server, a desktop computer, a laptop, a tablet, a mobile device, or the like.

Example discrete graphics card slot 114 may be an MXM slot. In one example, adapter card 100 may include a circuit board 102 having a male interface 104 (e.g., an MXM interface) to be inserted into discrete graphics card slot 114 (e.g., a female interface) and a PCIe slot 106 to communicatively couple a PCIe device 108.

Example PCIe slot 106 may be a PCIe ×4 slot. For example, PCIe ×4 slot may include an M.2 PCIe interface.

Example PCIe device 108 may include a wireless local area network (LAN) device, an SSD, or the like. Example SSD may include an M.2 non-volatile memory express (NVMe) SSD, M.2 advanced host controller interface (AHCI) SSD, M.2 serial advanced technology attachment (SATA) SSD, and the like. In this example, SATA, AHCI, and NVMe may represent a type of peripheral protocol.

Further, adapter card 100 may include a voltage converter circuit 110 disposed on circuit board 102 to convert a first voltage associated with discrete graphics card slot 114 to a second voltage corresponding to PCIe device 108. For example, voltage converter circuit 110 may convert 19 volts associated with discrete graphics card slot 114 to 3.3/1.8 volts corresponding to PCIe device 108.

Furthermore, adapter card 100 may include a level shifter circuit 112 disposed on circuit board 102 to modify a signal level in discrete graphics card slot 114 to a signal level in PCIe device 108. For example, a system management bus (SMBus) may be used for sideband/SMBus signal communication between the electronic device to PCIe device 108. The SMBUS signals may include various signals transmitted to/received from PCIe device 108. For example, the sideband signal may indicate the motherboard whether adapter card 100 is physically present in discrete graphics card slot 114 and if present, the power requirement of adapter card 100. In this example, MXM slot's SMBus may be native to 3.3 volts level while PCIe device 108 may accept 1.8 volts. Therefore, level shifter circuit 112 may modify 3.3 volts signal level in discrete graphics card slot 114 to 1.8 volts signal level in PCIe device 108.

In some examples, the components of adapter card 100 may be implemented in hardware, machine-readable instructions, or a combination thereof. In one example, voltage converter circuit 110 and level shifter circuit 112 may be implemented as engines or modules comprising any combination of hardware and programming logic such as a programmable field gate arrays to implement the functionalities described herein. For example, voltage converter circuit 110 and level shifter circuit 112 may be a combination of field effect transistors (FET), bipolar transistors, capacitors, inductors, low-dropout regulators (LDO), application-specific integrated circuits (ASIC), and/or resistors to implement the functionalities described herein.

During operation, PCIe signals of discrete graphics card slot 114 may be utilized to support PCIe device 108 via PCIe slot 106. In one example, discrete graphics card slot 114 may include PCIe ×16 (16-lanes) from a central processing unit. The PCIe ×16 (16-lanes) may be reconfigured to PCIe 1×8 (8-lanes) and PCIe 2×4 (two 4-lanes) such that one of the PCIe 2×4 (two 4-lanes) may be connected to PCIe slot 106 to support PCIe device 108. In other examples, a maximum of three slots (i.e., a PCIe ×8 slot and two PCIe ×4 slots) can be provided on adapter card 100 to support up to three PCIe devices via the PCIe 1×8 (8-lanes) and PCIe 2×4 (two 4-lanes). An example adapter card 100 with dual PCIe ×4 slots is explained in detail in FIG. 2.

Figure 2:
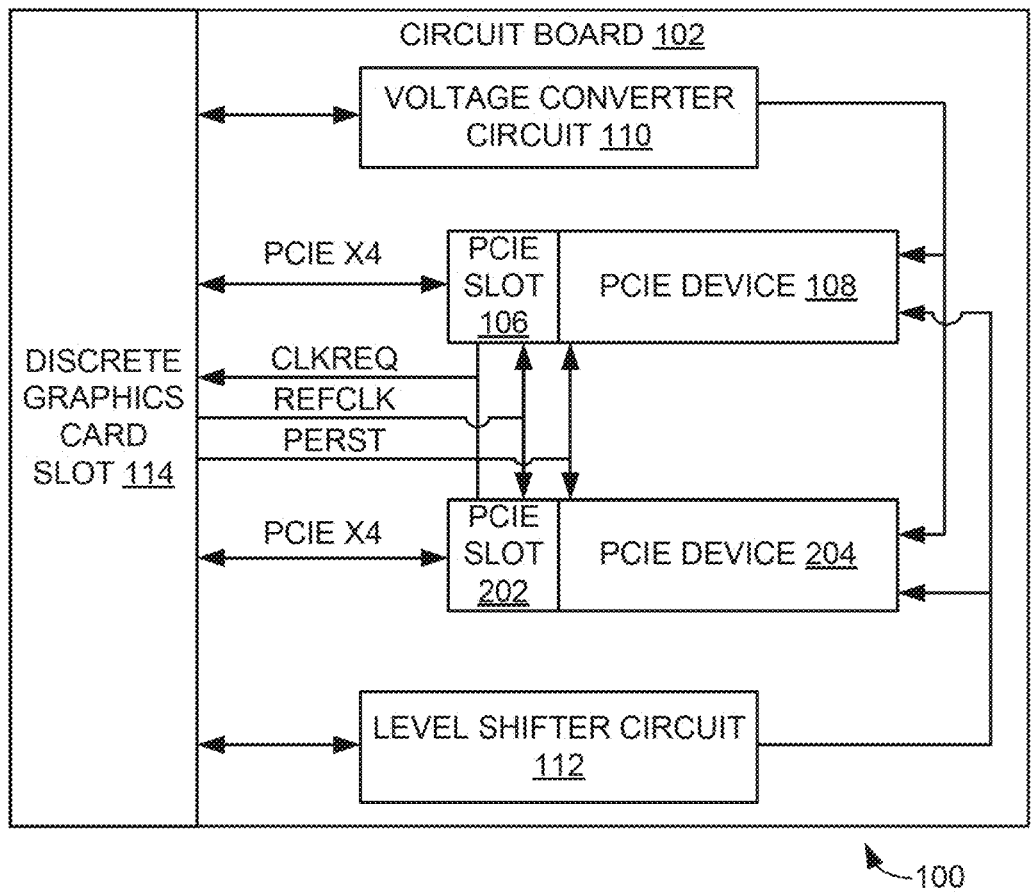
FIG. 2 is a block diagram of the example adapter card of FIG. 1, depicting additional features.

FIG. 2 is a block diagram of example adapter card 100 of FIG. 1, depicting additional features. For example, similarly named elements of FIG. 2 may be similar in structure and/or function to elements described with respect to FIG. 1. In the example shown in FIG. 2, adapter card 100 may be an MXM to dual PCIe slot adapter card. As shown in FIG. 2, adapter card 100 may include two PCIe slots 106 and 202 to receive two PCIe devices 108 and 204, respectively.

As shown in FIG. 2, voltage converter circuit 110 may be operably connected to PCIe devices 108 and 204 to supply voltage corresponding to PCIe devices 108 and 204 using a voltage associated with discrete graphics card slot 114. Further, level shifter circuit 112 may be operably connected to PCIe devices 108 and 204 to supply a modified signal level to PCIe devices 108 and 204 based on a signal level in discrete graphics card slot 114.

During operation, the MXM to dual PCIe slot adapter card (e.g., 100) may be inserted into discrete graphics card slot 114. Further, PCIe ×16 (16-lanes) of discrete graphics card slot 114 may be configured to PCIe 1×8 (8-lanes) and PCIe 2×4 (two 4-lanes) via basic input/output system (BIOS) and hardware (HW) strap according to PCIe devices 108 and 204 connected to PCIe slots 106 and 202. As shown in FIG. 2, the PCIe 2×4 (two 4-lanes) may be connected to respective one of PCIe slots 106 and 202 to enable operation of PCIe devices 108 and 204 (e.g., two SSDs), respectively. In other examples, adapter card 100 can include a PCIe ×8 slot to support a LAN card via PCIe 1×8 (8-lanes).

Thus, adapter card 100 can be connected to an MXM slot to facilitate two PCIe ×4 slots for users pursuing increased SSDs regardless of a discrete GPU. In the examples described herein, discrete graphics card slot 114 may be described with reference to an MXM slot, however, examples described herein can also be implemented with other discrete graphics card slots having different types of connectors and different numbers of pins to support the discrete GPU. Also, examples described herein may also be implemented using unused MXM slots to support additional SSDs.

In some examples, adapter card 100 may receive a reference clock signal (REFCLK) from the electronic device to facilitate synchronization of timing circuits associated with PCIe devices 108 and 204 and the electronic device. Further, adapter card 100 may generate a clock request signal (CLKREQ) to the electronic device to request an availability of the reference clock signal to enable sending or receiving data. Furthermore, adapter card 100 may receive a persist signal (PERST) from the electronic device to manage functionalities of adapter card 100 based on a power supply of the electronic device. The reference clock signal, the clock request signal, and the persist signal may be explained in detail in FIG. 6.

Figure 3:
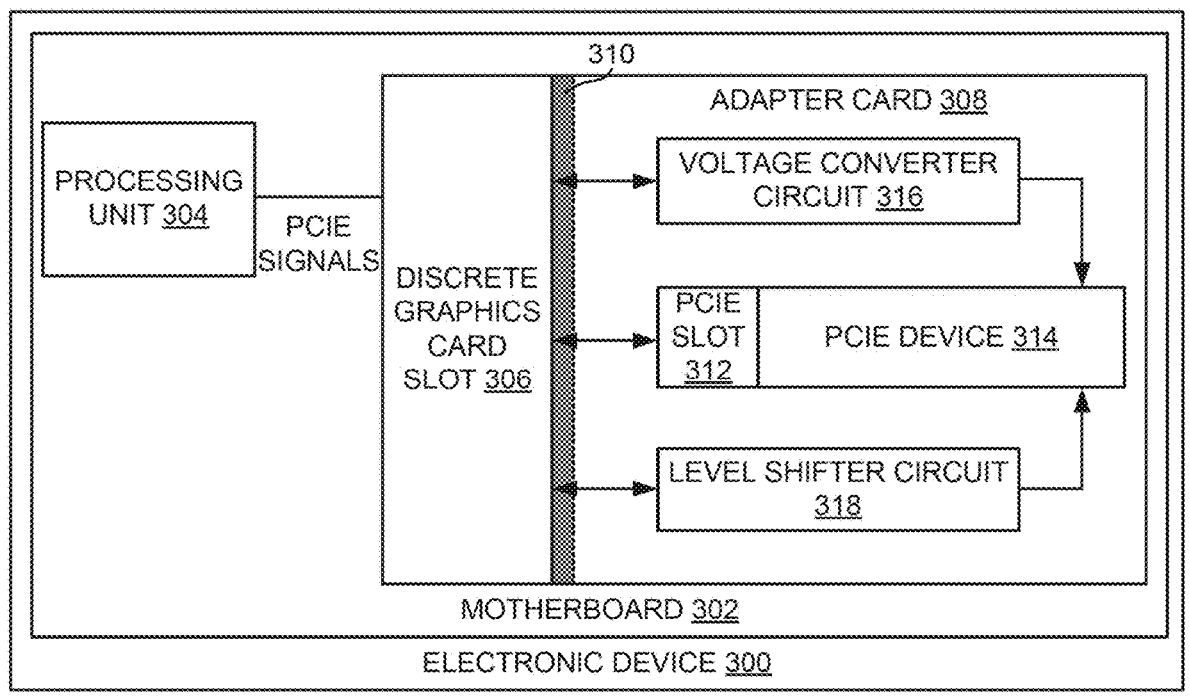
FIG. 3 is a block diagram of an example electronic device, depicting an example adapter card connected to a discrete graphics card slot to support a PCIe device.

FIG. 3 is a block diagram of an example electronic device 300, depicting an example adapter card 308 connected to a discrete graphics card slot 306 to support a PCIe device 314. Example electronic device 300 may include a motherboard 302. In other examples, electronic device 300 may include various peripheral devices, such as a monitor, a keyboard, a mouse, which can be communicably coupled to motherboard 302. Further, motherboard 302 may include a processing unit 304. In other examples, motherboard 302 may include various forms of volatile and non-volatile memory, and PCIe slots for additional devices to be communicably coupled to motherboard 302, thereby facilitating functionality of electronic device 300.

Furthermore, motherboard 302 may include discrete graphics card slot 306 communicatively connected to processing unit 304 to receive PCIe signals. Example discrete graphics card slot 306 may be an MXM slot to receive a discrete graphics card such as a discrete GPU. However, some users may prefer increased PCIe slots (e.g., PCIe ×4 slots) to connect additional storage devices (e.g., SSDs) rather than discrete GPUs.

Therefore, examples described herein may provide adapter card 308 that can be connected to discrete graphics card slot 306 and support additional PCIe devices (e.g., PCIe device 314) such as SSDs by utilizing the PCIe signals and power of discrete graphics card slot 306. In some examples, adapter card 308 may include dimensions substantially similar to that of the discrete graphics card such that adapter card 308 can be disposed in an area reserved for the discrete graphics card. Also, examples described herein may be applicable to electronic devices (e.g., thin client devices) with reduced number of PCIe slots, PCI-X slots, or any other expansion slots.

Adapter card 308 may include a male interface 310 inserted into discrete graphics card slot 306. In one example, adapter card 308 may be communicatively coupled to motherboard 302 via discrete graphics card slot 306. Further, adapter card 308 may include PCIe slot 312 to communicatively couple PCIe device 314 (e.g., an SSD, a wireless LAN device, or the like). Example discrete graphics card slot 306 may be an MXM slot and example PCIe slot may be a PCIe ×4 slot. In one example, the PCIe signals of discrete graphics card slot 306 may be utilized to support PCIe device 314 via PCIe slot 312. In some examples, discrete graphics card slot 306 may transmit data such as, processing data, clocking data to synchronize data between motherboard 302 and adapter card 308, and data related to the features provided by adapter card 308.

Further, discrete graphics card slot 306 may supply power, current and/or voltage to adapter card 308 to allow adapter card 308 to function and to communicate with motherboard 302. In one example, adapter card 308 may include a voltage converter circuit 316 to convert a first voltage associated with discrete graphics card slot 306 to a second voltage corresponding to PCIe device 314. Also, adapter card 308 may include a level shifter circuit 318 to modify a signal level in discrete graphics card slot 306 to a signal level in PCIe device 314. In other examples, adapter card 308 can include a second PCIe slot to connect a second PCIe device to motherboard 302. An example adapter card 308 with dual PCIe ×4 slots is explained in FIG. 4.

Figure 4:
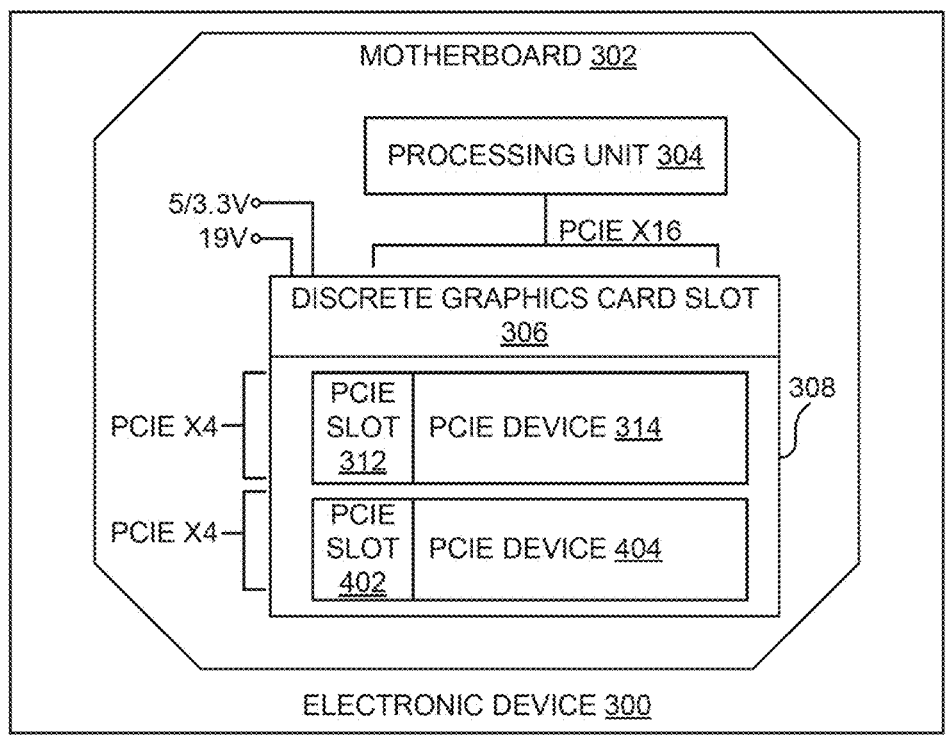
FIG. 4 is a schematic diagram of the example electronic device of FIG. 3, depicting additional features.

FIG. 4 is a schematic diagram of example electronic device 300 of FIG. 3, depicting additional features. For example, similarly named elements of FIG. 4 may be similar in structure and/or function to elements described with respect to FIG. 3. In the example shown in FIG. 4, adapter card 308 may be an MXM to dual PCIe slot adapter card. As shown in FIG. 4, adapter card 308 may include two PCIe slots 312 and 402 to receive two PCIe devices 314 and 404, respectively. Further, PCIe devices 314 and 404 may be supported by voltage converter circuit 316 and level shifter circuit 318 (e.g., as shown in FIG. 3).

As shown in FIG. 4, discrete graphics card slot 306 may be electrically coupled to a +19 volt power supply and a +5/3.3 volt power supply through different signal paths. In one example, +19 volt power supply and +5/3.3 volt power supply may be provided by a power supply (VCC). Further, voltage converter circuit 316 may convert 19 volts associated with discrete graphics card slot 306 to 3.3 volts corresponding to PCIe devices 314 and 404. Similarly, level shifter circuit 318 may modify 3.3 volts signal level in discrete graphics card slot 306 to 1.8 volts signal level in PCIe devices 314 and 404. In other examples, a separate voltage converter circuit 316 and a level shifter circuit 318 may be operably coupled to each of PCIe devices 314 and 404 depending on voltage specifications of PCIe devices 314 and 404.

During operation, PCIe ×16 (16-lanes) of discrete graphics card slot 306 may be set to operate in a PCIe 1×8 (8-lanes) and PCIe 2×4 (two 4-lanes) configuration, for instance, via BIOS and hardware strapping. In this example, PCIe devices 314 and 404 may receive the PCIe signals from processing unit 304 via PCIe slots 312 and 402 connected to a respective one of first PCIe ×4 (4-lanes) and a second PCIe ×4 (4-lanes) of the PCIe 2×4 (two 4-lanes).

Electronic device 300 of FIGS. 3 and 4 may include computer-readable storage medium comprising (e.g., encoded with) instructions executable by a processor to implement functionalities described herein in relation to FIGS. 3 and 4. In some examples, the functionalities described herein, in relation to instructions to implement functions of components of electronic device 300 and any additional instructions described herein in relation to the storage medium, may be implemented as engines or modules comprising any combination of hardware and programming to implement the functionalities of the modules or engines described herein. The functions of components of electronic device 300 may also be implemented by a respective processor. In examples described herein, the processor may include, for example, one processor or multiple processors included in a single device or distributed across multiple devices.

Figure 5:
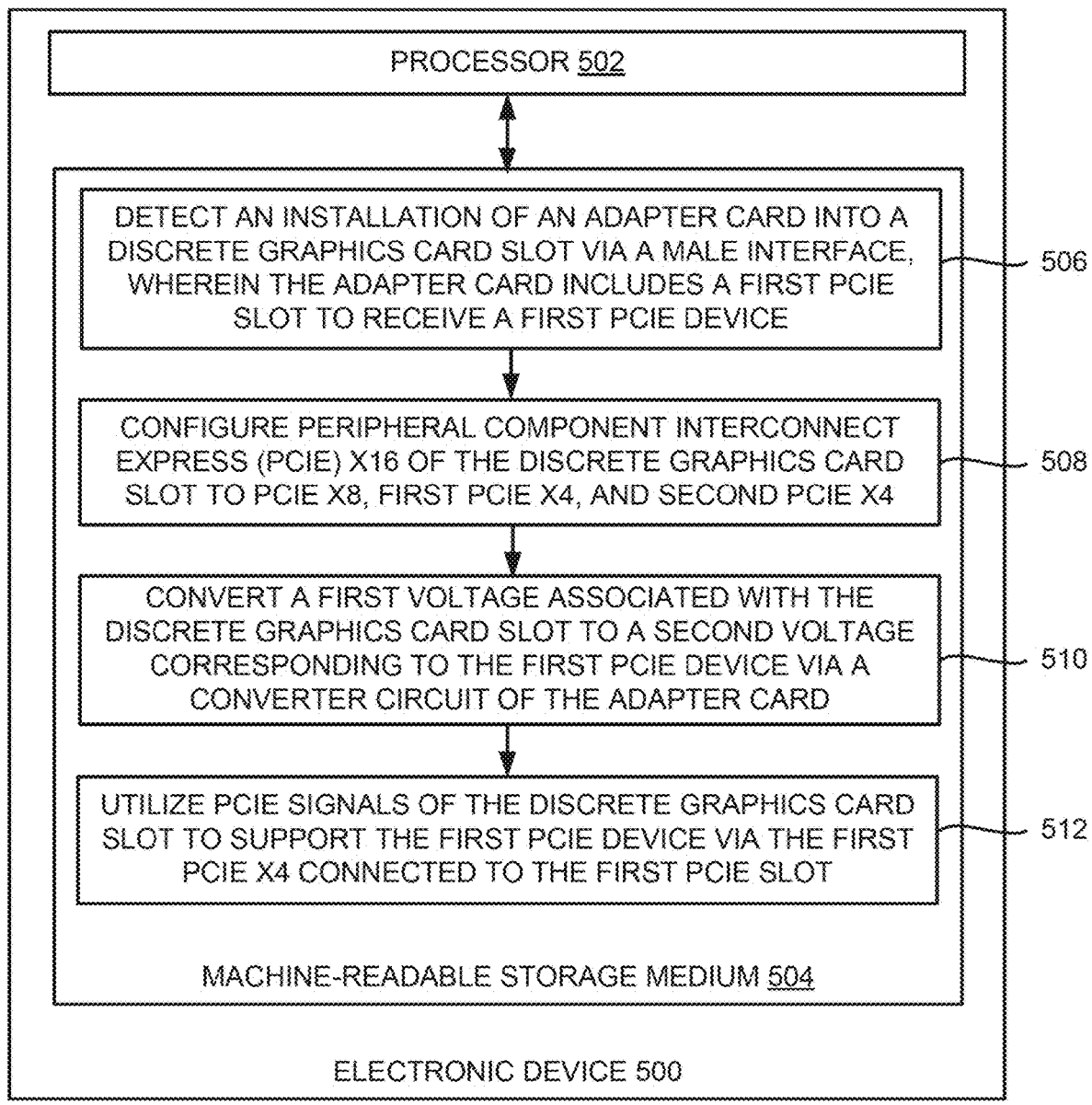
FIG. 5 is a block diagram of an example electronic device including a non-transitory machine-readable storage medium, storing instructions to utilize PCIe signals of a discrete graphics card slot to support a PCIe device.

FIG. 5 is a block diagram of an example electronic device 500 including a non-transitory machine-readable storage medium 504, storing instructions to utilize PCIe signals of a discrete graphics card slot to support a PCIe device. Electronic device 500 may include a processor 502 and machine-readable storage medium 504 communicatively coupled through a system bus. Processor 502 may be any type of central processing unit (CPU), microprocessor, or processing logic that interprets and executes machine-readable instructions stored in machine-readable storage medium 504. Machine-readable storage medium 504 may be a random-access memory (RAM) or another type of dynamic storage device that may store information and machine-readable instructions that may be executed by processor 502. For example, machine-readable storage medium 504 may be synchronous DRAM (SDRAM), double data rate (DDR), rambus DRAM (RDRAM), rambus RAM, etc., or storage memory media such as a floppy disk, a hard disk, a CD-ROM, a DVD, a pen drive, and the like. In an example, machine-readable storage medium 504 may be a non-transitory machine-readable medium. In an example, machine-readable storage medium 504 may be remote but accessible to electronic device 500.

As shown in FIG. 5, machine-readable storage medium 504 may store instructions 506-512. In an example, instructions 506-512 may be executed by processor 502 to utilize PCIe signals of the discrete graphics card slot (e.g., an MXM slot) to support the PCIe device. Instructions 506 may be executed by processor 502 to detect an installation of an adapter card into the discrete graphics card slot via a male interface. The adapter card may include a first PCIe slot to receive a first PCIe device.

Instructions 508 may be executed by processor 502 to configure PCIe ×16 (16-lanes) of the discrete graphics card slot to PCIe ×8 (8-lanes), first PCIe ×4 (4-lanes), and second PCIe ×4 (4-lanes). Example discrete graphics card slot may be an MXM slot of a motherboard. In one example, instructions to configure the PCIe ×16 (16-lanes) of the discrete graphics card slot to the PCIe ×8 (8-lanes), the first PCIe ×4 (4-lanes), and the second PCIe ×4 (4-lanes) may include instructions to configure the PCIe ×16 (16-lanes) of the discrete graphics card slot to the PCIe ×8 (8-lanes), the first PCIe ×4 (4-lanes), and the second PCIe ×4 (4-lanes) via BIOS and hardware strapping.

Instructions 510 may be executed by processor 502 to convert a first voltage associated with the discrete graphics card slot to a second voltage corresponding to the first PCIe device via a converter circuit of the adapter card. Instructions 512 may be executed by processor 502 to utilize PCIe signals of the discrete graphics card slot to support the first PCIe device via the first PCIe ×4 (4-lanes) connected to the first PCIe slot.

Further, the adapter card may include a second PCIe ×4 slot to receive a second PCIe device and connected to the second PCIe ×4 (4-lanes). In this example, machine-readable storage medium 504 may store instructions to utilize the PCIe signals of the discrete graphics card slot to support the second PCIe device disposed on the adapter card via the second PCIe ×4 (4-lanes).

In some examples, the discrete graphics card slot or the MXM slot may transmit data such as, processing data, clocking data to synchronize data between the motherboard and the adapter card, and data related to the features provided by the adapter card. In one example, instructions to utilize the PCIe signals of the discrete graphics card slot to support the first PCIe device via the first PCIe ×4 (4-lanes) may include instructions to generate a reference clock signal from the electronic device to the first PCIe device to facilitate synchronization of timing circuits associated with the first PCIe device and the electronic device, generate a clock request signal from the first PCIe device to the electronic device to request an availability of the reference clock signal to enable sending or receiving data, and generate a persist signal from the electronic device to the first PCIe device to manage functionalities of the adapter card based on power supply of the electronic device.

Figure 6:
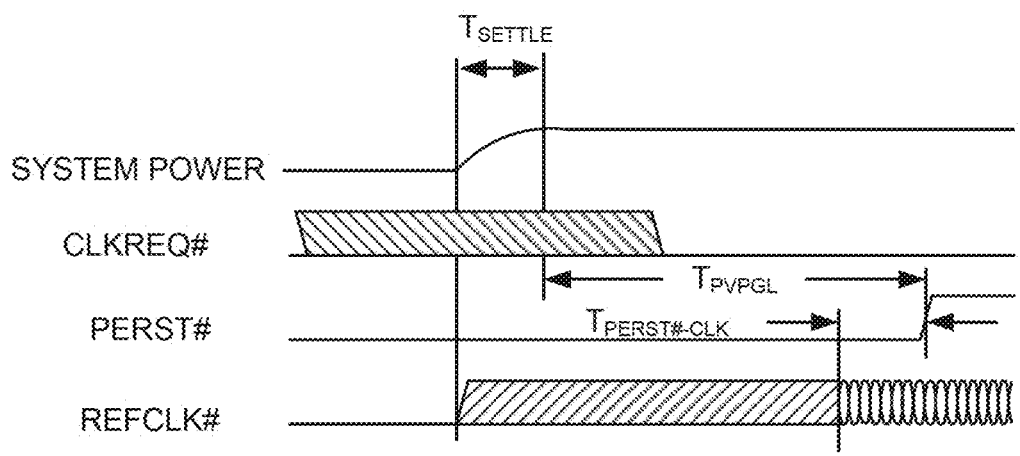
FIG. 6 is a graph depicting an example power supply sequence of a PCIe device connected to a PCIe slot of an adapter card.

FIG. 6 is a graph 600 depicting an example power supply sequence of a PCIe device connected to a PCIe slot of an adapter card. The reference clock signal (REFCLK #) may be used to assist the synchronization of PCIe interface timing circuits of the electronic device. Availability of the reference clock may be gated by the clock request signal (CLKREQ #). The clock request signal may be an open drain, active low signal that can be driven to low by the PCIe device (e.g., an M.2 device) to request that the reference clock to be available (i.e., an active clock state) in order to allow the PCIe interface to send/receive data. Operation of the clock request signal may be determined by the state of an enable clock power management bit in a link control register.

The persist signal (PERST #) may be de-asserted to indicate when the system power sources are within their specified voltage tolerance and are stable. The persist signal may be used to initialize the adapter card functions once the power supply stabilizes. The persist signal may be asserted when power is switched off and also is used by the system to force a hardware reset on the adapter card. The system may use the persist signal to cause a warm reset of the adapter card. The persist signal may be asserted in advance of the power being switched off in a power-managed state. The persist signal may be asserted when the power supply is powered down, but without the advanced warning of the transition.

As shown in FIG. 6, "$T_{SETTLE}$" may refer to a time taken for power rails to reach a corresponding minimum operating voltage (i.e., from each power rail at 0 V to a last power rail to reach associated minimum valid operating voltage). Example power rail may refer to +19 or 12/5/3.3 volts from the graphics card slot (e.g., 114 or 306 as shown in FIGS. 1-4). Other timing events related to PCIe may begin once the power rails have reached associated minimum operating voltage. For example, an adapter with a load capacitance of 330 µF and a soft-start current limited ramp of 200 mA on a power rail of 3.3 V, can settle within 5 ms.

In the example graph 600, the power is valid when the voltage supply rails or power rails have reached associated minimum operating voltage. Further, "$T_{PVPGL}$" may refer to a power that is valid to inactivate the persist signal. Furthermore, "$T_{PERST\ \#-CLK}$" may refer to a stable reference clock before inactivation of the persist signal.

It may be noted that the above-described examples of the present solution are for the purpose of illustration only. Although the solution has been described in conjunction with a specific implementation thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract, and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. An adapter card comprising:
a circuit board comprising:
a male interface to be inserted into a discrete graphics card slot; and
a peripheral component interconnect express (PCIe) slot to communicatively couple a PCIe device;
a voltage converter circuit disposed on the circuit board to convert a first voltage associated with the discrete graphics card slot to a second voltage corresponding to the PCIe device, wherein the discrete graphics card slot is a mobile PCI express module (MXM) slot; and
a level shifter circuit disposed on the circuit board to modify a signal level in the discrete graphics card slot to a signal level in the PCIe device.

2. The adapter card of claim 1, wherein the PCIe slot is a PCIe ×4 slot.

3. The adapter card of claim 1, wherein the PCIe device comprises a wireless local area network (LAN) device or a solid-state drive (SSD).

4. The adapter card of claim 1, wherein the discrete graphics card slot further comprises PCIe ×16 from a central processing unit, that is reconfigured to PCIe 1×8 and PCIe 2×4 such that PCIe 1×4 is to connect to the PCIe slot to support the PCIe device.

5. An electronic device comprising:
a motherboard comprising:
a processing unit; and
a discrete graphics card slot communicatively connected to the processing unit to receive peripheral component interconnect express (PCIe) signals, wherein the discrete graphics card slot is a mobile PCI express module (MXM) slot; and
an adapter card comprising:

a male interface inserted into the discrete graphics card slot;

a PCIe slot to communicatively couple a PCIe device, wherein the PCIe signals of the discrete graphics card slot are utilized to support the PCIe device via the PCIe slot;

a voltage converter circuit to convert a first voltage associated with the discrete graphics card slot to a second voltage corresponding to the PCIe device; and a level shifter circuit to modify a signal level in the discrete graphics card slot to a signal level in the PCIe device.

6. The electronic device of claim 5, wherein the PCIe slot is a PCIe ×4 slot.

7. The electronic device of claim 5, wherein the MXM slot is set to operate in a PCIe 1×8 and PCIe 2×4 configuration.

8. The electronic device of claim 7, wherein the PCIe device is to receive the PCIe signals from the processing unit via the PCIe slot connected to PCIe 1×4 of the MXM slot.

9. The electronic device of claim 5, wherein the PCIe device comprises a wireless local area network (LAN) device or a solid-state drive (SSD).

10. A non-transitory machine-readable storage medium encoded with instructions that, when executed by an electronic device, cause the electronic device to:

detect an installation of an adapter card into a discrete graphics card slot via a male interface, wherein the adapter card comprises a first peripheral component interconnect express (PCIe) slot to receive a first PCIe device, and wherein the discrete graphics card slot is a mobile PCI express module (MXM) slot of a motherboard;

configure PCIe ×16 of the discrete graphics card slot to PCIe ×8, first PCIe ×4, and second PCIe ×4;

convert a first voltage associated with the discrete graphics card slot to a second voltage corresponding to the first PCIe device via a converter circuit of the adapter card; and utilize PCIe signals of the discrete graphics card slot to support the first PCIe device via the first PCIe ×4 connected to the first PCIe slot.

11. The non-transitory machine-readable storage medium of claim 10, further comprising instructions to:

utilize the PCIe signals of the discrete graphics card slot to support a second PCIe device disposed on the adapter card via the second PCIe ×4 connected to a second PCIe slot of the adapter card.

12. The non-transitory machine-readable storage medium of claim 10, wherein instructions to utilize the PCIe signals of the discrete graphics card slot to support the first PCIe device via the first PCIe ×4 comprises instructions to:

generate a reference clock signal from the electronic device to the first PCIe device to facilitate synchronization of timing circuits associated with the first PCIe device and the electronic device;

generate a clock request signal from the first PCIe device to the electronic device to request an availability of the reference clock signal to enable sending or receiving data; and generate a persist signal from the electronic device to the first PCIe device to manage functionalities of the adapter card based on power supply of the electronic device.

13. The non-transitory machine-readable storage medium of claim 10, wherein instructions to configure the PCIe ×16 of the discrete graphics card slot to the PCIe ×8, the first PCIe ×4, and the second PCIe ×4 comprises instructions to:

configure the PCIe ×16 of the discrete graphics card slot to the PCIe ×8, the first PCIe ×4, and the second PCIe ×4 via basic input/output system (BIOS) and hardware strapping.

\* \* \* \* \*